United States Patent [19]

Pallant et al.

[11] 4,088,378
[45] May 9, 1978

[54] SEAT SLIDE INCLUDING RESILIENTLY DEFORMABLE ELEMENT

[75] Inventors: Joseph Pallant, Albrighton, near Wolverhampton; John Paul Johndrow, Stafford, both of England

[73] Assignee: H. R. Turner (Willenhall) Ltd., Walsall, England

[21] Appl. No.: 757,236

[22] Filed: Jan. 6, 1977

[30] Foreign Application Priority Data

Jan. 14, 1976 United Kingdom .................. 1295/76

[51] Int. Cl.² ............................................. F16C 29/02
[52] U.S. Cl. .................................... 308/3 R; 248/429; 308/3.6; 38/244
[58] Field of Search ................. 308/3.6, 3.8, 3 C, 3 R, 308/3.5, 244, DIG. 8; 248/429, 430

[56] References Cited

U.S. PATENT DOCUMENTS

| 2,886,095 | 5/1959 | Heyl, Jr. | 308/3.6 |
| 3,171,698 | 3/1965 | Campbell | 308/3.8 |
| 3,445,143 | 5/1969 | Swenson | 248/429 X |

*Primary Examiner*—Trygve M. Blix
*Assistant Examiner*—Douglas C. Butler
*Attorney, Agent, or Firm*—Marshall & Yeasting

[57] ABSTRACT

A seat slide comprises a guide channel and a slide part which is attached to the seat and slides within the channel. To afford free sliding movement considerable play is provided between the slide part and the guide channel but to avoid rattle particularly when the seat is not occupied, resiliently deformable plastics pads are located in the clearance gaps between the channel and the slide part to take up the play. These plastics pads not only take up the play but also facilitate sliding movement in that they can be made of a material having a low coefficient of friction.

9 Claims, 7 Drawing Figures

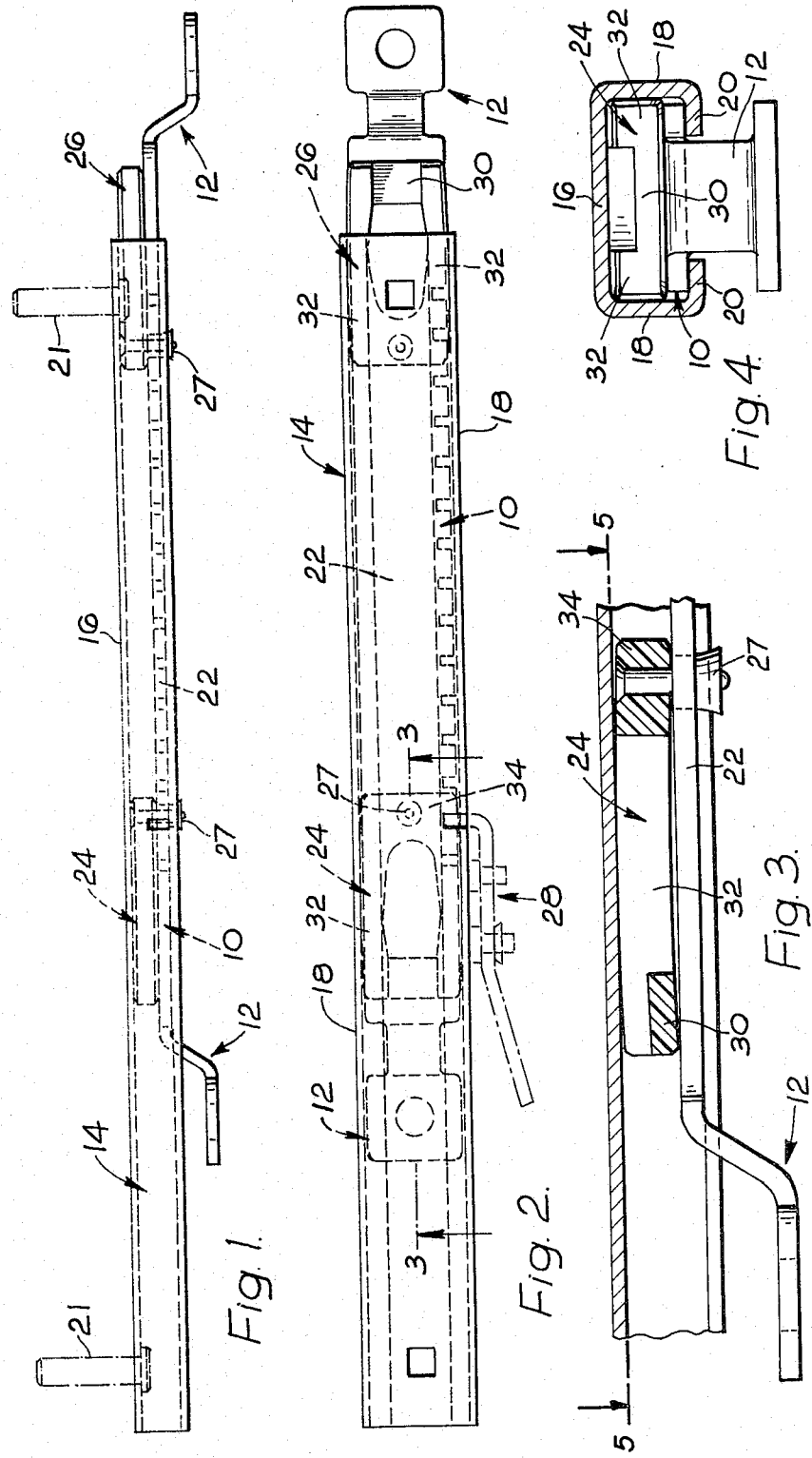

SEAT SLIDE INCLUDING RESILIENTLY DEFORMABLE ELEMENT

This invention relates to seat slides such as are used for fore-and-aft adjustments of the driver's and front passenger seats of a motor vehicle.

One of the difficulties in the design of seat slides is to make the seat easily movable, which implies maximum tolerance between the parts. Rattle is particularly likely with the passenger seat, which will frequently be unoccupied whilst the vehicle is in use.

The object of the invention is to provide an improved construction of seat slide to overcome the above difficulties.

According to the present invention we provide a seat slide comprising a first member in the form of a guide channel, a second member located in the guide channel and slidable lengthwise thereof, said members being intended to be secured one to the vehicle floor and the other to a vehicle seat, and at least one resiliently deformable element located between the two slide members, each such element being formed so as to resiliently hold the two members apart and the two members having confronting surfaces which abut when held apart by said at least one resiliently deformable element.

Each element may be of arcuate configuration in a direction lengthwise of the guide channel and may have first portions in contact with one of the slide members and a second portion intermediate said first portion in contact with the other slide member. Alternatively, each element may be formed with one or more projecting tongues of material which serve to hold the slide members apart as aforesaid.

Each element may comprise a strip of springy metal but preferably it is constituted by a strip of resiliently deformable plastics material. The plastics material may be selected to have the required coefficient of friction combined with the necessary resilience and a nylon material is considered preferable for these purposes.

Each resilient member may comprise a continuous curve about a single centre of curvature along its length, or may be sinuous so that two or more areas between its ends will contact one the slide members with the ends thereof contacting the other side member. Conveniently the resilient elements are anchored at fixed locations along the length of the slide members.

In the one embodiment wherein each element is of arcuate configuration, the element is fastened to the second member at or adjacent only one of said first portions and the elements are elongated lengthwise of the guide channel, the ends of said elements constituting said first portions and the mid-portion of each element constituting said second portion which contacts said guide channel but is spaced from said member by virtue of the curvature of the element. Because each element is fastened at or adjacent only one of its ends, the other end is free to move in the lengthwise direction in response to flattening of the element, as occurs when the latter is subjected to loading due to the presence of a seat occupant. The or each element may be fastened by rivetting or it may be formed with a projecting boss which is inserted, for example as a press-fit or with snap-engagement, into an aperture in one of the slide members.

The guide channel preferably has in-turned marginal portions at the free ends of the side walls of the channel and the second member may, over the major part of its length, be of substantially flat configuration, e.g. a flat metal pressing, with one substantially flat face located towards the mouth of the channel, the resilient elements or elements being disposed between the opposite flat face of the second member and the base of the channel. Hence, the resilience of said element or elements tends to urge said one flat face of the second member towards the inner faces of the in-turned marginal portions of the guide channel to provide substantial areas (i.e. said confronting surfaces) in contact with one another. A characteristic of this arrangement is that when the seat is occupied, the slide member connected to the seat is urged downwardly so as to increase the loading on the resilient element or elements and thereby tend to flatten their curvature or said tongues but tend to take the confronting surfaces out of engagement and create a maximum tolerance for free sliding and hence adjustment of the slide part.

It will be understood that when said one front side of the second member is in contact with the in-turned marginal portions of the guide channel, the play between the slide members is taken up, at least in this direction, thereby reducing or eliminating rattle.

Conveniently a certain amount of play between slide members is provided for in a side to side direction with respect to the guide channel and, in order to minimize any tendency for rattle to occur, it is preferred that the width of the or each element be at least the same as the internal width of the guide channel and that the element or elements be mounted on the second member so that they engage the side walls of the guide channel and tend to centralise the second member. Thus, to take up side to side play, each element is conveniently of a width (at at least one point along its length) equal to or greater than the internal width of the channel. When greater, the elements may enter the guide channel as a gentle push-fit either by virtue of their inherent resilience or by virtue of their configuration. For example, each element may have sides which are outwardly convex and may be recessed or apertured between its sides to enable its sides to flex inwardly when the element is inserted into the guide channel.

The invention will now be described by way of example with reference to the accompanying drawings wherein:

FIG. 1 is a side view of a seat slide according to the invention;

FIG. 2 is a plan view of the seat slide;

FIG. 3 is an enlarged sectional view on line 3—3 in FIG. 2;

FIG. 4 is an end view of the seat slide;

Figure 5:
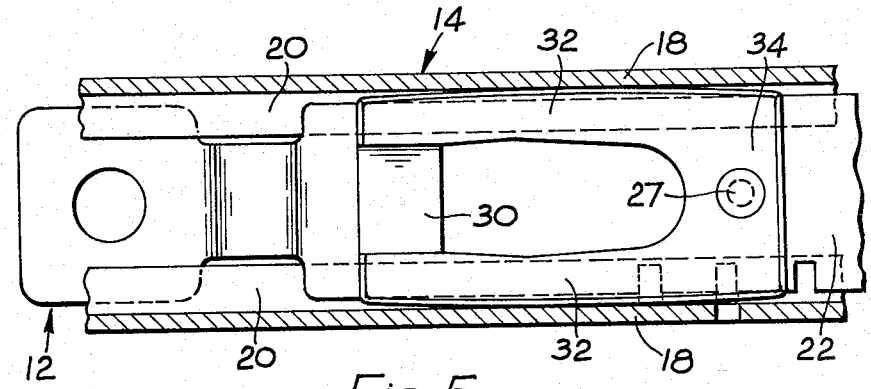
FIG. 5 is a sectional view on line 5—5 in FIG. 3.

Referring to FIGS. 1 to 5, the seat slide comprises a pressing 10 whose ends 12 are bent and shaped as shown and are fixed in use to the vehicle floor, and a guide channel 14 having a base 16, side walls 18 and in-turned flanges 20, the base 16 being fixed in use to the underside of the vehicle seat cushion frame by bolts 21. The guide channel 14 receives the central portion 22 of the slide member 10 with considerable clearance in the vertical direction and less clearance in the lateral direction. The clearance in these two directions is taken up by slipper pads 24, 26 as described hereinafter. A pivotal latch device 28 is provided on the guide channel to releasably hold the side members 10, 14 in selected positions of adjustment in known manner. In practice, the vehicle seat will have two such seat slides provided in parallel at its underside to allow forward and rearward adjustment of the seat.

Each slipper at 24, 26 is moulded from a resiliently deformable plastics material such as nylon and is of arcuate configuration in the lengthwise direction. As shown, each pad 24, 26 is generally U-shaped with an integral strip of material 30 extending its legs 32 (see FIG. 3). The bridge 34 of each slipper pad 24, 26 is apertured for reception of a fastener 27 which secures the pad to the central portion 22 of the slide member 10 with its bridge portion 34 located innermost with respect to the adjacent end of the slide member 10, the ends of each pad being in engagement with the slide member 10 and its mid-point being in engagement with the base of the channel. The curvature and thickness of each slipper pad 24, 26 is such that, when the seat is not occupied, the pads take up the vertical play between the slide members even though they are of less thickness than the vertical clearance between the parts, and they urge the marginal edge portions of the member 10 into abutment with the in-turned flanges 20, thus preventing rattle. When the seat is occupied, however, the load acting on each pad tends to flatten the mid-portion of the pad (this being possible because only one of its ends is anchored) so that the flanges 20 separate from the underside of the slide member 10 and the seat can be readily adjusted in position by releasing the latch 28.

In addition to taking up the vertical clearance, the pads also take up the lateral play between the channel 14 and slide member 10 in that the pads are made slightly outwardly convex at their lateral edges and their width is greater than that of the slide member 10 and preferably substantially equal to the internal width of the channel 14. The pads 24, 26 therefore serve to centralise the guide channel with respect to the slide member 10.

Figure 6:
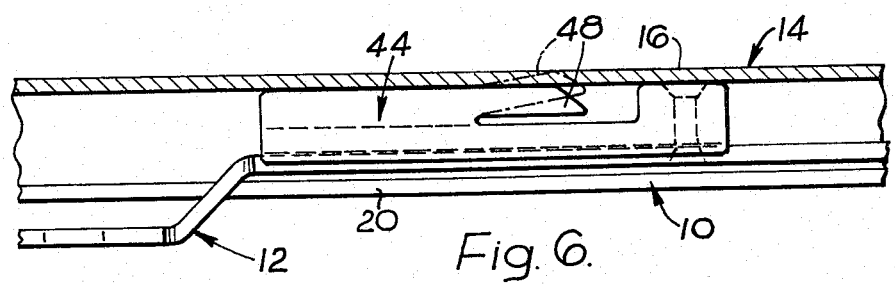
FIG. 6 is a view similar to FIG. 3 of a modification.
Figure 7:
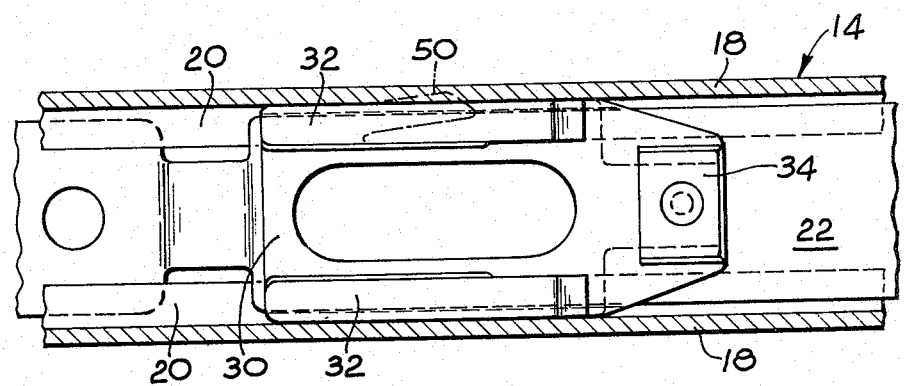
FIG. 7 is a view similar to FIG. 5 of the modification.

FIGS. 6 and 7 illustrate a modification in which each slipper pad 44, instead of being arcuate, is generally flat, but is moulded with tongue portions 48 on its upper face which, when unstressed (i.e. when the seat is not occupied) project upwardly as indicated in broken outline to hold the flanges 20 of the guide channel 14 against the underside of the slide member 10. When the seat is occupied, however, which condition is indicated in FIG. 6, the tongues 48 are flattened and assume the position shown in full outline. The flanges 20 are thus disengaged from the underside of the slide member 10 to facilitate sliding.

In addition to the upwardly projecting tongues 48, each slipper pad 44 may also have laterally projecting tongues 50 which, when unstressed as indicated in broken outline in FIG. 7, project outwardly but which are deformed inwardly when the pad is received within the channel 14 to take up any lateral play between the channel and the slide member 10. In the embodiment of FIGS. 6 and 7, the underside of each slipper pad 44 is recessed lengthwise so as to seat on the slide member 10. The pad shown in FIGS. 1 to 5 may be similarly recessed if desired.

It will be noted that in both embodiments, i.e. FIGS. 1 to 5 and FIGS. 6 and 7, the slipper pads serve not only to take up the clearances between the two slide members so as to prevent rattle but also serve as slide members during adjustment of the seat.

We claim:

1. A seat slide for supporting a vehicle seat above the floor of a vehicle, comprising a first member in the form of a guide channel having a base, side walls with in-turned flanges and an opening between said in-turned flanges, a second elongate member mounted in the guide channel for lengthwise sliding therein, said second member having first and second surfaces which respectively confront the base and the in-turned flanges of the first member, and at least one resiliently deformable element located in said first member between the base thereof and said first surface of the second member, each such element being resiliently deformable from a first configuration in which it resiliently urges the second member away from the base of the first member to cause said second surface of the second member to abut the in-turned flanges of the first member, and a second configuration in which it allows the second member to move towards the base of the first member to an extent sufficient to create a clearance between said in-turned flanges and the second surface of said second member, said at least one element being caused to assume said second configuration in response to loads applied to the slide in a direction perpendicular to said base and serving to transmit such loads between the first and second members.

2. A seat slide as claimed in claim 1 in which said at least one element is arcuate when in said first configuration and flat when in said second configuration.

3. A seat slide as claimed in claim 2 in which said at least one element, when in said first configuration, has end portions thereof in contact with one of said first and second members and an intermediate portion thereof in contact with the other of said first and second members.

4. A seat slide as claimed in claim 1 in which said at least one element comprises a main body whose thickness is less than the internal separation between said base and said first surface when said second surface is in abutment with the in-turned flanges, and at least one integral tongue projecting from the body to cause abutment between said surface and the in-turned flanges as aforesaid, the tongue being deflectable back towards the body when the slide is subject to loading.

5. A seat slide as claimed in claim 1 in which said at least one element is of an overall width greater than said second slide member.

6. A seat slide as claimed in claim 5 in which the sides of said at least one element are outwardly convex.

7. A seat slide as claimed in claim 1 in which said at least one element is provided with integral tongues at each side thereof which, when unstressed, project laterally outwardly, said tongues engaging the side walls of said channel and being deflected thereby inwardly of the channel.

8. A seat slide as claimed in claim 1 in which said at least one element is anchored at one end only to one of said first and second members.

9. A seat slide as claimed in claim 1 in which said at least one element includes a pair of spaced legs joined at one end by a bridge portion which is anchored to one of said first and second members.

* * * * *